United States Patent Office 2,793,961
Patented May 28, 1957

2,793,961

COMPOSITION FOR PREPARING METAL SURFACES

Gerald E. Oven, Detroit, Mich., assignor to Rinshed-Mason Company, Detroit, Mich., a corporation of Michigan No Drawing. Application March 3, 1955,
Serial No. 492,040

2 Claims. (Cl. 106—296)

This invention relates to the preparing of surfaces of metal for the reception of a coating of paint, lacquer, enamel or the like.

In the manufacture of articles comprised of fabricated sheet metal, such as sheet steel, which are to be given a desirable finish of paint, lacquer, enamel or the like, there are certain areas and places where the surface is improved by the application of solder metal. Such locations and places are, for example, joints where panels are placed together, welded areas, and the like. The solder metal is used to make the exposed surfaces smooth to thus conceal the underlying imperfections in the sheet metal or the apparent imperfection due to welding or the like. An example of a product where the application of solder metal is used is bodies of automotive vehicles.

It is known that the surface provided by such solder metal possesses cavities or recesses and other irregularities and many times such cavities or recesses are of a re-entrant nature; that is to say, the cavity may have a small opening at the surface and may enlarge inwardly of the opening. It may be said that the surface contains pores and to this extent is porous or pitted. When such a surface has a coating of paint applied thereover, using the term "paint" broadly to cover lacquers, enamels, and, perhaps, varnishes, and the like, gaseous substance or liquid substance or other extraneous material is frequently trapped in the cavities. Such material expands or evaporates under heat and the internal pressure created raises and ruptures the overlying covering of paint and forms a defect frequently called a blister or pit. The cavities are minute, and this difficulty exists even though the surface is cleaned before the paint is applied. This situation is emphasized where the paint is set or dried by the application of heat. Solder metal surfaces are cited as an outstanding example of surfaces to be treated by this invention, but the invention may be employed in treating or preparing surfaces of other metals where cavities, recesses or pits exist.

One object of the invention is to provide an improved composition applicable to the solder surfaces, which can be caused to enter the cavities and fill the same thus displacing objectionable gaseous, liquid or solid substances which would expand and rupture the exterior coating. An other object of the invention is to provide a composition which will remain stable in its container while it is handled or stored in its container prior to use. Another object of the invention is to provide a composition which will not have a deleterious affect upon those who use the composition. In this connection, it may be pointed out that with compositions heretofore used, many people were sensitive to or apparently allergic to some of the ingredients as the same affected the skin and caused breaking out of the skin. The active ingredient in this composition is one which could not be used alone because it could not be worked and handled so as to fill the cavities or pores in the metal and accordingly the invention provides a composition which includes an ingredient termed an "extender" which makes feasible the use of the active ingredient.

Assuming that an area of base metal structure, such as the sheet metal of an automobile body, has been treated by an overlying layer of solder metal, the solder area is first treated with a cleaner to remove surface contamination such as hand smears, oils, loose solder fillings and other elements detrimental to the finished paint surface. The preferred cleaner is phosphoric acid. An example of this cleaner is as follows:

Percent by weight
Phosphoric acid (86.6% concentrate) _____ 10
Water _____ 7
Isopropyl alcohol _____ 83

The surfaces may be wiped with a cloth dampened with this cleaner.

The improved composition is now applied. This improved composition comprises antimony sulfide pigment, zinc oxide pigment, silica colloidal suspension and alcohol. Isopropyl alcohol or ethyl alcohol are preferred because of their relative high volatility.

A preferred composition is as follows:

Percent by weight
Antimony sulfide pigment _____ 58
Zinc oxide pigment _____ 21.5
Silica colloidal suspension _____ 3
Isopropyl alcohol or ethyl alcohol _____ 17.5

The antimony sulfide pigment may contain about 64% antimony, about 25% sulphur, and about 5% silicon dioxide. The specific gravity about 4.34, with a weight per solid gallon about 36.15 lbs. The particle size of the antimony sulfide pigment is preferably about 6 microns.

The zinc oxide pigment has a specific gravity of about 5.6 with a weight per solid gallon of about 46.7 lbs. The particle size of the zinc oxide pigment is preferably about .22 micron.

The silica is preferably a colorless, uniform, impalpable powder with a weight per solid gallon of about 18.2 lbs. The alcohol has a weight per gallon of about 6.55 lbs., a distillation range substantially from 172° F. to 180° F. and a flash point of about 59° F.

Such a composition with the percentages above noted, has a consistency of paste. A quantity of the paste is applied to the surface to be treated and is rubbed over the surface preferably with a semi-rigid applicator which will aid in exerting a force on the work surface. The rubbing should be continued until the paste is dry. The semi-rigid type applicator may be made by balling a piece of cloth. When the paste is rubbed until dry the excess pigment on the surface is removed. Excess pigment is that on the exposed surfaces of the metal but not that contained in the cavities or pores. This may be done by strongly wiping the surface clean with a suitable cloth or other article. The zinc oxide pigment is the active ingredient and serves as the reactionary phase of the process. The zinc oxide pigment reacts with the phosphoric acid which remains on the surfaces in the cavities and forms a bond between said surfaces and the body of the composition which was caused to enter the cavities during the rubbing action.

The composition is rubbed into the pores or cavities, or caused by the force of the rubbing to enter and fill or substantially fill the cavities, including those of re-entrant form. The antimony sulfide pigment performs the function of an extender. By this is meant that the antimony sulfide pigment makes it feasible to force the zinc oxide pigment into the cavities. Without an extender the zinc oxide pigment could not be employed successfully to fill the cavities. The zinc oxide pigment, if wetted with the alcohol, tends to adhere together in a sort of slippery mass which would bridge the openings of cavities instead of being forced into the cavities. The extender breaks down or minimizes the adherent tendency of the zinc oxide pigment so that the resultant composition under the force of rubbing flows into the minute pores of pits of the metal which constitutes the cavities, pores and recesses above mentioned.

The silica provides properties for eliminating the settling or separating of the composition. As a result, the composition retains itself in suspension without separation of the ingredients even for long periods of time when the composition is retained in a suitable container prior to use. In this connection it might be said that compositions heretofore employed settled out in the container, some solids compacting in the bottom of the container into a hard mass making it sometimes practically impossible to restore the mixture to its original useful suspension form. The silica also serves as an extender and in this regard aids the extender properties of the antimony sulfide pigment. The alcohol functions only as a carrier or a medium for obtaining paste consistency of the dry pigments. The use of a relatively highly volatile alcohol shortens the time required in the application of the composition and promotes a condition where the alcohol has evaporated from the cavities and recesses leaving the inert composition filling such recesses.

The above preferred percentages of a composition which has been found satisfactory may, of course, be varied. For example, the antimony sulfide pigment may vary throughout the preferred range of from 30% to 60%. The percentage of antimony sulfide pigment may be lowered as will presently be seen. The zinc oxide pigment may be varied through the preferred range from 20% to 55%. The silica may be varied through a preferred range of from 2% to 10%. The alcohol may be varied through a preferred range of from 16% to 50%. The percentages are all by weight.

The antimony sulfide pigment in the composition may be dropped to less than 30%, but in so doing the percentages of zinc oxide pigment is increased. The more zinc oxide pigment used the more alcohol is required as the carrier. If alcohol is deposited in a cavity in the metal remains unevaporated and the paint is applied thereover, the situation is bad as the alcohol evaporates and expands and may cause a blister or rupture of the paint. So it is preferred to use a lower percentage of zinc oxide pigment with a higher percentage of the antimony pigment so that less alcohol is needed to give the desired paste consistency. Then, too, the antimony sulfied pigment is principally the ingredient which would settle out of the composition and the more antimony sulfide pigment employed, the more silica required to maintain the suspension.

The preferred composition, therefore, has sufficient zinc oxide pigment to fill the cavities of the metal with facility incident to the rubbing action without requiring the use of an excess amount of alcohol and with sufficient antimony sulfide pigment to properly serve as an extender so that the zinc oxide pigment may enter the cavities. The composition with about 58% antimony sulfide pigment, about 21.5% zinc oxide pigment, with about 3% silica and about 17.5% alcohol, appears to be about the optimum for obtaining the overall best results and is thus preferred although, as stated above, the percentages may be varied. Such variation may be preferred on different classes of work and different conditions.

This composition has been found to be better and to produce overall better results than compositions for this purpose heretofore known. It is better from the standpoint of the physical application of the composition to the work surface. It is better in that it fills the cavities more effectively and more completely. The composition in any of the permissible percentages is desirable because most users thereof are not sensitive to it and it causes no skin trouble or erruptions.

After the composition has been rubbed into the work surface until dry, and the excess removed the surface is ready to be painted in any usual manner, which usually consists of first applying one or more base coats followed by one or more finish coats of paint, lacquer, enamel or the like. Should the drying or setting of the paint be accelerated by the application of heat, the relatively inert dried composition in the cavities does not expand or evaporate and thus cause blisters or rupturing of the paint coating.

In the claims appended hereto the term "pitted" is used to define a surface with cavities, recesses or pores as above described, and the term "paint" is used in a broad sense to cover paint, lacquer, enamel, varnish and the like.

I claim:

1. A composition for application to pitted work surfaces to condition the same for paint, which surfaces have been cleaned with a phosphoric acid treatment comprising, antimony sulfide pigment from about 30% to about 60% by weight, zinc oxide pigment from about 20% to about 55% by weight, silica in powder form from about 2% to about 10% by weight, all in suspension in alcohol from about 16% to about 50%, the alcohol selected from the group of isopropyl and ethyl alcohol and the composition having the consistency of paste.

2. A composition for application to pitted work surfaces to condition the same for paint, which surfaces have been cleaned with a phosphoric acid treatment comprising, antimony sulfide pigment about 58% by weight, zinc oxide pigment about 21.5% by weight, silica in powder form about 3% by weight, all in suspension in alcohol about 17.5% by weight, the alcohol being selected from the group of isopropyl alcohol and ethyl alcohol and the composition having the consistency of paste.

References Cited in the file of this patent

UNITED STATES PATENTS

| 2,251,869 | Gamble et al. | Aug. 5, 1941 |
| 2,625,492 | Young | Jan. 13, 1953 |

FOREIGN PATENTS

| 103,946 | Australia | May 10, 1938 |

OTHER REFERENCES

Pages 66 and 81 of book entitled "Emulsions and Foams," by Berkman and Egloff, 1941.

Stewart, J. R.: "National Paint Dictionary," Stewart Research Laboratory, Washington, 1948, ed. 3, page 45.

Turner, F. M.: "The Condensed Chemical Dictionary," Reinhold Publishing Corp., New York, 1950, ed. 4, pages 60–61.

Currie, L. M.: "Antimony Sulphides," Journal of Physical Chemistry, 1926, 30, pages 206–207.